3,321,398
MANUFACTURE OF CLAY-THICKENED GREASES
Gerard P. Caruso, New Orleans, La., assignor to Shell Oil Company, New York, N.Y., a corporation of Delaware
No Drawing. Filed Mar. 12, 1965, Ser. No. 439,471
9 Claims. (Cl. 252—28)

This invention is concerned with the production of clay-thickened greases. More particularly, it is concerned with the manufacture of high-quality greases from so-called "dry" waterproofed clays.

Waterproofed clays are usually of one of two general classes of materials, namely, the so-called onium clays which are chemical reaction products formed between high base exchange clays and onium compounds and clays bearing cationic oleophilic (hydrophobic) surface-active agents which are principally physically adsorbed upon the clay surfaces. Such oleophilic clays have found many uses such as in the production of thickened lubricants, greases, paints, printing inks, wax compositions, sprays, coatings, polished compositions and the like. One of the problems involved in this area comprises the production of an oleophilic clay which can be manufactured at one geographical location but utilized in another without involving the transportation of non-essential ingredients such as water or oil. The economic desirability of being able to do this is apparent in that many locations throughout the world possess locally produced products which could be modified with an oleophilic clay instead of requiring the shipment of the product to be so modified to the relatively scarce locations where oleophilic clays are produced.

One of the principal problems involved in this field comprises the production of an oleophilic clay product which can be dispersed in its eventual end use compositions, e.g., lubricating oils or greases, without the use of complicated equipment and with maximum dispersion of the oleophilic clay in this end use medium. The colloidal nature of clay is such that if not properly treated, the structure of the clay collapses irretrievably and cannot be reexpanded. Thus, the problem is one of preparing a pulverulent product designed to be transported to any desired geographical location and which can be dispersed in its eventual end use medium with desirable expansion of the clay structure so that it can perform its suitable gelling or thickening effect.

Another one of the problems involved in the preparation of compositions comprising an oleophilic clay is the set of conditions required for its dispersal and expansion. In the first place, of course, it is necessary to disperse the clay thoroughly throughout the medium and subject it to sufficient homogenizing so that colloidal particles are formed. In most instances, this is not a mere matter of physical homogenizing but requires the use of heat as well. Provision of the necessary heat is by itself quite expensive in that special equipment, such as jacketed kettles and steam generation facilities, is required in addition to an economical primary source of heat energy. Thus to obtain low cost products such as outlined above, it would be highly desirable to avoid this heating requirement. Moreover, in many geographical locations, a source of heating is either unduly expensive or difficult or impractical to maintain. Consequently, it would be highly desirable not only to produce an oleophilic pulverulent clay product which is re-expandable to its maximum capability in a given medium but also to produce one which can be so dispersed without the use of heat. Such a product is described in applicant's copending U.S. patent application Ser. No. 355,940, filed Mar. 30, 1964. The process for making a grease from such product comprises merely subjecting lubricating oil and a minor grease-forming proportion of the product to homogenization, usually at temperatures of 60–170° F.

Now in accordance with the invention, it has been found that the yield, mechanical stability and appearance of greases made from "dry" clay waterproofed thickening agents can be greatly improved by incorporating into the lubricating base oil a small amount of a mixture of (1) hydrocarbyl-substituted imidazoline and (2) a 1,3-dioxolane-2-one substituted with from 0 to 4 $C_{1-4}$ alkyl groups, the total number of substituent carbon atoms being no more than 10.

The grease compositions of the invention therefore consist essentially of (1) a lubricating base oil containing (2) a minor amount of the above-mentioned hydrocarbyl-substituted imidazoline and 1,3-dioxolane-2-one thickened to grease consistency by means of a waterproofed clay.

The lubricating base oil may be either natural or synthetic and will generally be chosen upon consideration of the application to which the grease is to be put. Greases to be used at less severe temperature conditions (e.g. up to about 300° F.) will use a mineral base oil, while synthetic esters are preferred at temperatures up to about 350–400° F. In this latter category are synthetic lubricating oils of known types, such as the phosphorus esters, silicon esters and aliphatic esters formed by esterification of aliphatic dicarboxylic acids with monohydric alcohols, and polyphenyl ethers. Typical species of these materials include tricresyl phosphate, dioctyl phthalate, di-2-ethylhexyl sebacate and azelate, and the like.

Lubricants to be employed at temperatures in excess of about 400° F. are those having an inherent high thermal stability including the halocarbons and organosilicone fluids. The halocarbons may be those described in Peterson et al., U.S. Patent 2,679,479, and include especially the fluorocarbon oils, preferably distilling above about 200° F. at atmospheric pressure.

The clay thickening agents to which the invention is applicable are pulverulent products which have been waterproofed so as to render them dispersible in lubricating base oils in such manner that the clay structure expands to produce a gelling or thickening effect. Such clays may contain in addition to a waterproofant small amounts of water or even lubricating oil, but they are characterized as "dry" thickeners since they are pulverulent or even powdery in form. One such product comprises a dried oil-dispersible clay product passing a 250-mesh screen, which comprises a high basic exchange clay bearing on the surfaces thereof 40–100% by weight, based on the clay, of oleophilic nitrogen compounds selected from the group consisting of imidazolines, amino amides which are formed between certain fatty acids and a mixture of polyethylene polyamines, and mixtures of such imidazolines and amino amides, said pulverulent product having dispersed therethrough 0.1–5.0% by weight of water. It is preferred that hectorite clay be utilized and that the product have dispersed therethrough 0.3–2% by weight of water. When the oleophilic nitrogen compound is an imidazoline, it is preferred that it be one substituted with a long hydrocarbyl chain and be utilized in an amount of 50–125% by weight of the clay and more preferably, in an amount of 75–100%.

Still another suitable thickening agent is that which is produced by (1) forming a clay hydrosol of a high base exchange clay, (2) adding thereto 4–12% by weight, based on the clay, of phosphoric acid and 50–75% by weight of an oleophilic amine, and (3) drying the mixture so formed to obtain a pulverulent product containing 2.5–25% by weight of water.

The imidazoline component of the two-component mixture, which is incorporated into the lubricating base oil, may be characterized generally as a hydrocarbyl-substituted imidazoline. However, preferred types of hydrocarbyl-substituted imidazolines are those which are N-substituted with alkylol or alkyl amine, particularly polyalkyl polyamine, groups. The hydrocarbyl substituents may be both alkyl and/or alkenyl groups.

Suitable imidazolines are derived by reaction of long chain (preferably $C_{10-20}$) fatty acids with $C_{2-3}$ alkylene diamines, poly ($C_{2-3}$ alkylene amines), alkanol amines, and poly(alkanol amines). The following imidazolines are exemplary.

Hydocarbyl-substituted:
   2-heptadecenyl imidazoline
   2-undecyl imidazoline
   2-octadecyl imidazoline
   2-dodecyl imidazoline
   2-tetradecyl-4,5-dimethyl imidazoline
   4-heptadecenyl imidazoline
   4-octadecyl imidazoline
   4-hexadecyl-2-butyl imidazoline Alkylol-substituted:
   1-β-hydroxyethyl-2-heptadecenyl imidazoline
   2-β-hydroxyethyl-4-undecyl imidazoline
   4-β-hydroxyethyl-1-heptadecyl imidazoline
   1-β-hydroxybutyl-2-heptadecyl imidazoline
   2-α-hydroxyhexyl-4-dodecenyl imidazoline
   1-β-hydroxyethyl-2-undecyl imidazoline
   1-β-hydroxyethyl-2-mixed heptadecenyl and heptadecadienyl imidazoline Amino-substituted:
   1-β-amionethyl-2-heptadecenyl imidazoline
   2-β-aminoethyl-4-octadecyl imidazoline
   1-triethylene triamino-2-heptadectyl imidazoline
   1-diethylenediamino-2-hexadecyl imidazoline
   1-imidazolino-2-heptadecyl imidazoline An example of this type of imidazoline is the reaction product of hydroxy ethyl ethylene diamine or N-(2-aminoethyl) ethanolamine $$(HO\text{---}CH_2\text{---}CH_2\text{---}NH\text{---}CH_2\text{---}CH_2\text{---}NH_2)$$

and tall oil fatty acids to given 1-hydroxyethyl, 2-mixed heptadecenyl and heptadecadienyl imidazoline which has the following structure formula:

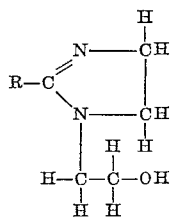

wherein R is a heptadecenyl or heptadecadienyl radical.

Still more preferred are the imidazolines wherein the alkylol radical is directly attached to the nitrogen atom in the 1 position in the ring.

The amino substituted imidazolines are typified by those in which the amino substituent is an aliphatic, cyclic or mixed cyclic-aliphatic amino group having at least 1 basic nitrogen atom and preferably having at least 2 basic nitrogen atoms which can be primary, secondary or tertiary or any combination of the three.

The 1,3-dioxolane-2-one component of the mixture to be incorporated into the lubricating oil is comprised of 1,3-dioxolane-2-one's substituted with from 0 to 4 $C_{1-4}$ alkyl groups, the total number of substituent carbon atoms in which is no more than 10. Such materials correspond to the formula

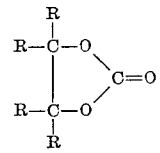

in which R is $C_{1-4}$ alkyl or hydrogen. Suitable compounds of this type are exemplified by 4-methyl-1,3-dioxolane-2-one (referred to frequently as propylene carbonate), 4-isobutyl-1,3-dioxolane-2-one, 4,5-dimethyl-1,3-dioxolane-2-one, 4-ethyl-1,3-dioxolane-2-one, 4,5-di-n-butyl-1,3-dioxolane-2-one, 4-ethyl-5-methyl-1,3-dioxolane-2-one, 4-isopropyl-1,3-dioxolane-2-one and 1,3-dioxolane-2-one (sometimes referred to as ethylene carbonate). Mono-alkyl-substituted 1,3-dioxolane-2-one's corresponding to the formula

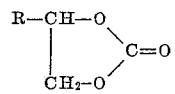

in which R is $C_{1-4}$ alkyl, are preferred for use in accordance with the invention.

The invention will be better understood by reference to the following examples.

*Example I*

Two sample greases were prepared by adding a mineral lubricating oil to a waterproofed clay power thickening agent and passing the mixture through a Gaulin homogenizer at 5000 p.s.i.g. The lubricating base of each grease consisted of 98.1% by weight of mineral lubricating oil having a viscosity of 75 SSU at 210° F., 1% by weight of a high-molecular-weight polyethylene glycol having the tradename "Carbowax," and 0.9% of phenyl-α-naphthylamine oxidation inhibitor. To one portion of the base oil was added 1.0% wt. of the imidazoline reaction product of N-(2-amino ethyl) ethanolamine and tall oil fatty acids. To the other portion of base oil was added 1.4% wt. of a mixture of the same imidazoline and 4-methyl-1,3-dioxolane-2-one (propylene carbonate), the weight ratio of acids to propylene carbonate being 1.8:1.

It was found to be necessary to run the formulation which contained only the imidazoline through the homogenizer twice to obtain a satisfactory low penetration grease. Moreover, the grease which container both the imidazoline and the propylene carbonate was smoother and less grainy in appearance. Both greases was then tested as to mechanical stability by means of the stirred slump and the roll stability tests.

In the stirred slump test, the grease is evaluated as to consistency stability and slump stability. In this test, the grease is charged to a heated mixing device in which it is stirred for 16 hours at 122° F. At the end of the 16 hours, the grease sample is removed. One portion of the sample is measured as to micropenetration and another portion is subjected to the beaker slump test which evaluates the tendency of grease to slump when used in wheel bearing hubs. In this test, a continuous collar of grease is formed by means of a template on the inside walls of a 600 ml. beaker which is maintained at a temperature of 284° F. for one hour. Upon cooling to room temperature, the percentage of the bottom of the beaker which is covered with grease is determined by means of concentric rating scale which is read through the bottom of the beaker. The volume of separated oil is also reported. Beaker slump ratings of less than 80% are equivalent to passing ASTM method D1263, wheel bearing test.

The composition and properties of the above-described test greases were as follows:

TABLE II.—COMPOSITION AND PROPERTIES OF GREASES PREPARED FROM PULVERULENT CLAY THICKENING GREASES

| Formulation, percent wt.: | | |
|---|---|---|
| Thickening Agent | 10.0 | 10.0 |
| Lubricating Base Oil | 88.9 | 88.5 |
| Water | 0.1 | 0.1 |
| Imidazoline | 1.0 | 0.9 |
| 4-Methyl-1,3-dioxolane-2-one | None | 0.5 |
| Properties: | | |
| Penetration—Single Pass through Homogenizer: | | |
| Unworked | 339 | 286 |
| Worked | 337 | 293 |
| Penetration—Two Passes through Homogenizer: | | |
| Unworked | 298 | |
| Worked | 308 | |
| Stirred Slump: | | |
| Percent Beaker Bottom Coverage | 68 | 50 |
| Separated Oil, ml | 7 | 2 |

Though the grease which did not contain the 4-methyl-1,3-dioxolane-2-one required more severe milling, both greases had good work stability as measured by the worked and unworked penetrations. However, the grease in accordance with the invention was decidedly superior in its stirred slump stability.

A series of tests was then made to determine whether other compounds similar to the 1,3-dioxolane-2-one were likewise effective and also to determine whether the 1,3-dioxolane-2-one by itself, i.e., without the hydrocarbyl-substituted imidazoline, was effective to improve milling characteristics and mechanical stability.

*Example II*

Four test greases were prepared as in Example I by adding a mineral lubricating oil (75 SSU at 210° F.) to a waterproofed clay powder thickening agent. Each sample contained 12% by weight thickening agent except one as indicated below. Three of the mineral oils contained 0.6% wt. of hydrocarbyl-substituted imidazoline and 0.6% wt. of an organic carbonate. The fourth sample contained 1.25% wt. propylene carbonate (4-methyl-1,3-dioxolane-2-one) but no imidazoline. Each mixture of clay and oil was passed once through a Bosch homogenizer at 2000 p.s.i.g., after which the penetration of the resulting grease was measured. The results were as follows:

TABLE III.—COMPOSITION AND PROPERTIES OF GREASES PREPARED FROM PULVERULENT CLAY THICKENING AGENTS

| | A | B | C | D |
|---|---|---|---|---|
| Formulation, percent wt.: | | | | |
| Thickening Agent | 12.0 | 12.0 | 12.0 | 12.5 |
| Lubricating Base Oil | 86.6 | 86.6 | 86.6 | 86.05 |
| Water | 0.2 | 0.2 | 0.2 | 0.2 |
| Imidazoline [1] | 0.6 | 0.6 | 0.6 | None |
| Diethyl Carbonate | 0.6 | None | None | None |
| Butyl Diglycol Carbonate | None | 0.6 | None | None |
| Propylene Carbonate | None | None | 0.6 | 1.25 |
| Consistency before Milling | Fluid | Fluid | Firm Gel | Soft Gel |
| Penetration after Milling: | | | | |
| Unworked | >400 | >400 | 218 | 310 |
| Worked | | | 238 | 308 |

[1] Reaction product of N-(2-aminoethyl)ethanolamine and mixed $C_{10-20}$ fatty acids.

From the foregoing data, it is apparent that the cyclic oxolane structure, illustrated by the propylene carbonate, is necessary to obtain a grease of satisfactory consistency. On the other hand, from test D, it is likewise apparent that the cyclic oxoalen is not by itself sufficient to improve yield. By comparison of the results obtained here with the results obtained in Example I, it can readily be seen that the imidazoline and the oxolane do interact, though the nature of this unexpected interaction is not at all understood. In any event, the occurrence of this favorable interaction appears to be a function of the relative proportions of the mixture of imidazoline and 1,3-dioxolane-2-one. This is seen in the following example.

*Example III*

Five more test greases were prepared in which the ratio of imidazoline to 1,3-dioxolane-2-one was varied from 0.67 to 3.0. The greases were prepared in the manner of Example I, using a 75 SSU at 210° F. oil, and each was subjected to the stirred slump test. The results were as follows:

TABLE IV.—EFFECT OF IMIDAZOLINE-TO-PROPYLENE CARBONATE RATIO ON PROPERTIES OF GREASE PREPARED FROM PULVERULENT CLAY THICKENING AGENTS

| | E | F | G | H | I |
|---|---|---|---|---|---|
| Formulation, percent wt.: | | | | | |
| Thickening Agent | 11.0 | 11.0 | 11.0 | 10.0 | 11.0 |
| Lubricating Base Oil | 87.0 | 87.0 | 87.0 | 88.5 | 87.0 |
| Water | None | None | None | 0.1 | None |
| Imidazoline (I) | 0.75 | 1.0 | 1.25 | 9.9 | 1.5 |
| Propylene Carbonate (PC) | 1.25 | 1.0 | 0.75 | 0.5 | 0.5 |
| Ratio I/PC by wt | 0.67 | 1.0 | 1.67 | 1.8 | 3.0 |
| Total I+PC | 2.0 | 2.0 | 2.0 | 1.4 | 2.0 |
| Penetration of Milled Grease: | | | | | |
| Unworked | 285 | 261 | 264 | 286 | 272 |
| Worked (60 strokes) | 311 | 294 | 288 | 298 | 293 |
| Stirred Slump Test: | | | | | |
| Separated Oil, percent wt | | 11 | 7 | 2 | 10 |
| Penetration after Test (micropen) | | 164 | 169 | 188 | 137 |

The foregoing data indicate that when the I/PC ratio is below about 0.75, the grease is too soft (low yield) and that excessive oil separation and hardening of the grease takes place in the stirred slump test. Interestingly, it appears that the use of I/PC ratios above about 3.5 result in a grease having the same shortcomings. Thus the weight ratio of imidazoline to 1,3-dioxolane-2-one should be about 0.75 to 3.5 and probably from about 1.0 to about 2.5.

The amount of oil separation in the stirred slump test indicates that a too high total amount of fatty acid and 1,3-dioxolane-2-one may incur excessive bleeding. On the other hand, if too low amount of the mixture of imidazoline and 1,3-dioxolane-2-one is used, the grease yield is too low. Consequently, it is preferred that at least 0.5 but no more than 3.5% by weight of the mixture be added to the oil and still more preferably at least 1.0 but no more than 2.5% by weight of the mixture be used.

The following are therefore examples of additional pulverulent clay-thickened greases which are within the scope of the invention:

| Example | IV | V | VI | VII | VIII | IX | X | XI |
|---|---|---|---|---|---|---|---|---|
| Pulverulent Waterproofed Clay | 6 | 12 | 11 | 10 | 10 | 14 | 9 | 10 |
| Lubricating Base Oil: | | | | | | | | |
| Mineral Oil | 93.5 | -------- | 87.5 | 88 | -------- | -------- | 88 | 86.5 |
| Silicone Oil | -------- | -------- | -------- | -------- | -------- | 83 | -------- | -------- |
| Di-2-ethylhexyl azelate | -------- | -------- | -------- | -------- | 87.5 | -------- | -------- | -------- |
| Pentaerythritol esters | -------- | 87 | -------- | -------- | -------- | -------- | -------- | -------- |
| Imidazoline (a): | -------- | -------- | -------- | -------- | 1.7 | 2.1 | 2.2 | 2.7 |
| 1-β-aminoethyl-2-heptadecenyl imidazoline | } 0.22 | 0.5 | 0.75 | 1.2 | -------- | -------- | -------- | -------- |
| 1-β-hydroxyethyl-2-dodecenyl imidazoline | | | | | | | | |
| 4-mixed heptadecenyl and heptadecadienyl imidazoline | | | | | | | | |
| 1,3-dioxolane-2-one (b): | | | | | | | | |
| 4-ethyl- | -------- | -------- | 0.75 | -------- | -------- | -------- | -------- | 0.8 |
| 4-n-propyl- | -------- | -------- | -------- | 0.8 | -------- | -------- | 0.8 | -------- |
| 4,5-dimethyl- | -------- | -------- | -------- | -------- | -------- | 0.9 | -------- | -------- |
| Unsubstituted | 0.28 | 0.5 | -------- | -------- | 0.8 | -------- | -------- | -------- |

I claim as my invention:

1. An improved grease composition consisting essentially of (1) a lubricating base oil containing (2) a minor stabilizing amount of a mixture of (a) a hydrocarbyl-substituted imidazoline and (b) a 1,3-dioxolane-2-one substituted with from 0 to 4 $C_{1-4}$ alkyl groups, the total number of substituent carbon atoms being no more than 10, in which mixture the ratio of (a) to (b) is from about 0.75 to 1 to about 3.5 to 1, the lubricating oil being thickened to grease consistency with from 3 to 25% by weight, basis total composition, of a pulverulent waterproofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines, and amino amides, said pulverulent product having dispersed therethrough 0.5–5% by weight of water.

2. An improved grease composition consisting essentially of (1) a lubricating base oil containing (2) 0.5 to 3.0% by weight, basis total composition, of a mixture of (a) a $C_{10-20}$-hydrocarbyl-substituted imidazoline and (b) a 1,3-dioxolane-2-one substituted with from 0 to 4 $C_{1-4}$ alkyl groups, the total number of substituent carbon atoms being no more than 10, in which mixture the ratio of (a) to (b) is from about 0.75 to 1 to about 3.5 to 1, the lubricating oil being thickened to grease consistency with from 3 to 25% by weight, basis total composition, of a pulverulent waterproofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines and amino amides, said pulverulent product having dispersed therethrough 0.5–5% by weight of water.

3. An improved grease composition consisting essentially of (1) a lubricating base oil containing (2) 0.5 to 3.0% by weight, basis total composition, of a mixture of (a) a $C_{10-20}$-hydrocarbyl-substituted imidazoline and (b) a 1,3-dioxolane-2-one substituted with from 0 to 4 $C_{1-4}$ alkyl groups, the total number of substituent carbon atoms being no more than 10, in which mixture the ratio of (a) to (b) is from about 1.0 to 1 to about 2.5 to 1, the lubricating oil being thickened to grease consistency with from 3 to 25% by weight, basis total composition, of a pulverulent waterproofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines and amino amides, said pulverulent product having dispersed therethrough 0.5–5% by weight of water.

4. An improved grease composition consisting essentially of (1) a lubricating base oil containing (2) a minor stabilizing amount of a mixture of (a) a $C_{10-20}$ hydrocarbyl-substituted imidazoline and (b) a mono-$C_{1-4}$-alkyl-substituted 1,3-dioxolane-2-one, in which mixture the ratio of (a) to (b) is from 0.75 to 1 to about 3.5 to 1, the lubricating oil being thickened to grease consistency with from 3 to 25% by weight, basis total composition, of a pulverulent waterproofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines and amino amides, said pulverulent product having dispersed therethrough 0.5–5% by weight of water.

5. The composition of claim 4 in which the mono-$C_{1-4}$-alkyl-substituted 1,3-dioxolane-2-one is 4-methyl-1,3-dioxolane-2-one.

6. An improved grease composition consisting essentially of (1) a lubricating base oil containing (2) 0.5 to 3.0% by weight, basis total composition of (a) a $C_{10-20}$-hydrocarbyl-substituted imidazoline and (b) a mono-$C_{1-4}$-alkyl-substituted 1,3-dioxolane-2-one, in which mixture the ratio of (a) to (b) is from about 0.75 to 1 to about 3.5 to 1, the lubricating oil being thickened to grease consistency with from 3 to 25% by weight, basis total composition, of a pulverulent water-proofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines and amino amides, said pulverulent product having dispersed therethrough 0.1–5% by weight of water.

7. An improved grease composition consisting essentially of (1) a lubricating base oil containing (2) 0.5 to 3.0% by weight, basis total composition of (a) 1-hydroxyethyl, 2-mixed heptadecenyl and heptadecadienyl imidazoline and (b) a mono-$C_{1-4}$-alkyl-substituted 1,3-dioxolane-2-one, in which mixture the ratio of (a) to (b) is from about 0.75 to 1 to about 3.5 to 1, the lubricating oil being thickened to grease consistency with from 3 to 25% by weight, basis total composition, of a pulverulent waterproofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines and amino amides, said pulverulent product having dispersed therethrough 0.1–5.0% by weight of water.

8. An improved grease composition consisting essentially of (1) a lubricating base oil containing (2) 0.5 to 3.0% by weight, basis total composition of (a) a $C_{10-20}$-hydrocarbyl-substituted imidazoline and (b) 4-methyl-1,3-dioxolane-2-one, in which mixture the ratio of (a) to (b) is from about 0.75 to 1 to about 3.5 to 1, the lubricating oil being thickened to grease consistency with from 3 to 25% by weight, basis total composition, of a pulverulent water-proofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines and amino amides, said pulverulent product having dispersed therethrough 0.1–5.0% by weight of water.

9. An improved grease composition consisting essentially of (1) a lubricating base oil containing (2) 0.5 to 3.0% by weight, basis total composition of (a) 1-hydroxyethyl, 2-mixed heptadecenyl and heptadecadienyl imidazoline and (b) 4-methyl-1,3-dioxolane-2-one, in which mixture the ratio of (a) to (b) is from about 0.75 to 1 to about 3.5 to 1, the lubricating oil being thickened to grease consistency with from 3 to 25% by weight, basis total composition, of a pulverulent water-proofed clay thickening agent, the clay being waterproofed by means of 40–100% by weight, based on the clay, of oleophilic nitrogen compounds selected from the group consisting of imidazolines, amino amides which are formed between $C_{10-20}$ fatty acids and a mixture of polyethylene polyamines, and mixtures of such imidazolines and amino amides, said pulverulent product having dispersed therethrough 0.1–5.0% by weight of water.

References Cited by the Examiner

UNITED STATES PATENTS

| | | | |
|---|---|---|---|
| 2,875,152 | 2/1959 | VanScoy | 252—28 |
| 2,939,840 | 6/1960 | Franczak | 252—28 |

DANIEL E. WYMAN, *Primary Examiner.*

I. VAUGHN, *Assistant Examiner.*